United States Patent [19]
Sawahata

[11] Patent Number: 5,977,551
[45] Date of Patent: Nov. 2, 1999

[54] METHOD CAPABLE OF ACCURATELY SIMULATING ION IMPLANTATION AT A HIGH SPEED

[75] Inventor: Koichi Sawahata, Tokyo, Japan

[73] Assignee: NEC Corporation, Tokyo, Japan

[21] Appl. No.: 08/961,098

[22] Filed: Oct. 30, 1997

[30] Foreign Application Priority Data

Oct. 31, 1996 [JP] Japan ................................... 8-289410

[51] Int. Cl.$^6$ ................................................ H01J 37/317
[52] U.S. Cl. ..................................... 250/492.21; 250/398
[58] Field of Search ............................... 250/492.21, 398

[56] References Cited

U.S. PATENT DOCUMENTS 4,800,100   1/1989   Herbots et al. ..................... 250/492.21

OTHER PUBLICATIONS

Masami Hane, "Ion Implantation Model Considering Crystal Structure Effects", IEEE Transactions On Electron Devices, vol. 37, No. 9, Sep. 1990, pp. 1959–1963.

Japanese Office Action, dated Dec. 8, 1998, with English language translation of Japanese Examiner's comments.

Rafferty, C. S., et al., "Iterative methods in semiconductor device simulation," *IEEE Transactions on Electron Devices*, vol. 32, No. 10, Oct. 1985, pp. 2018–2027.

*Primary Examiner*—Keit T. Nguyen
*Attorney, Agent, or Firm*—Whitham, Curtis & Whitham

[57] ABSTRACT

On simulating ion implantation on the basis of Monte Carlo method, a plurality of triangle meshes are produced to a polygonal substrate to be label serial numbers at a first step. An ion is implanted as an implanted ion to the polygonal substrate at a second step. At a third step, the triangle meshes are checked in an ascending order until one of triangle meshes is found as a specific triangle mesh in which the implanted ion is positioned. Point defect concentration is extracted from the specific triangle mesh at a fourth step. Random numbers are generated in order to calculate scattering of the implanted ion a fifth step. The point defect concentration is renewed into a renewed point defect concentration in the specific triangle mesh at a sixth step. The energy, the position, and the travelling direction is renewed in the implanted ion at a seventh step. The third to the seventh steps is repeated until the implanted ion stops in said polygonal substrate.

6 Claims, 9 Drawing Sheets

METHOD CAPABLE OF ACCURATELY SIMULATING ION IMPLANTATION AT A HIGH SPEED

BACKGROUND OF THE INVENTION

This invention relates to a method for use in manufacturing semiconductor devices, more particularly, to a method for simulating ion implantation.

In general, Monte Carlo method is known as a method for simulating ion implantation. A conventional simulation method is disclosed in EDDIE VAN SCHIE AND JAN MIDDELHOEK, "Two Methods to Improve the Performance of Monte Carlo Simulations of Ion Implantation in Amorphous Targets", IEEE Trans. CAD, vol. 8, No.2, pages 108 to 113, 1989 and will be referred to a first conventional simulation. The first conventional simulation is a method used for an amorphous substrate.

Another conventional simulation method is disclosed in MASAKI HANE AND MASAO FUKUMA, "Ion Implantation Model Considering Crystal Structure Effects", IEEE Trans. ED vol.37, No.9, 1990 and will be referred to a second conventional simulation. The second conventional simulation is a method used for a substrate having crystal structure.

By the way, it is difficult to accurately carry out simulation for ion implantation at a high speed in each of the first and the second conventional simulations as will be described later.

SUMMARY OF THE INVENTION

It is an object of this invention to provide a method capable of accurately simulating ion implantation at a high speed.

Other objects of this invention will become clear as the description proceeds.

On describing the gist of this invention, it is possible to understand that a method is for simulating ion implantation on the basis of Monte Carlo method.

According to a first aspect of this invention, the simulation method comprises steps of producing a plurality of triangle meshes to a substrate, implanting an ion as an implanted ion to the substrate, and calculating, at each of the triangle meshes, distributions of impurities and point defects which are based on the implanted ion.

According to a second aspect of this invention, the simulation method comprises a first step of producing a plurality of triangle meshes to a polygonal substrate to label the triangle meshes serial numbers, a second step of implanting an ion as an implanted ion to the polygonal substrate, a third step of checking the triangle meshes in an ascending order until one of the triangle meshes is found as a specific triangle mesh in which the implanted ion is positioned, a fourth step of extracting point defect concentration from the specific triangle mesh, a fifth step of generating random numbers to calculate scattering of the implanted ion, a sixth step of renewing the point defect concentration in the specific triangle mesh, a seventh step of renewing energy, position, and travelling direction of the implanted ion, and an eighth step of repeating the third to the seventh steps until the implanted ion stops in the polygonal substrate.

According to a third aspect of this invention, the simulation method comprises a first step of producing a plurality of triangle meshes to a polygonal substrate, a second step of producing a plurality of orthogonal meshes to the polygonal substrate, the orthogonal meshes being equal in shape to one another, a third step of registering the triangle meshes as registered triangle meshes in correspondence to the orthogonal meshes, a fourth step of implanting an ion as an implanted ion to the polygonal substrate, a fifth step of detecting one of the orthogonal meshes as a detected orthogonal mesh in which the implanted ion is positioned, a sixth step of searching the registered triangle meshes in correspondence to the detected orthogonal mesh to detect one of the registered triangle meshes as a detected triangle mesh in which the implanted ion is positioned, a seventh step of extracting point defect concentration from the detected triangle mesh, an eighth step of generating random numbers to calculate scattering of the implanted ion, a ninth step of renewing the point defect concentration in the detected triangle mesh, a tenth step of renewing energy, position, and travelling direction of the implanted ion, and an eleventh step of repeating the fifth to the tenth steps until the implanted ion stops in the polygonal substrate.

DESCRIPTION OF THE PREFERRED EMBODIMENTS

Figure 1:
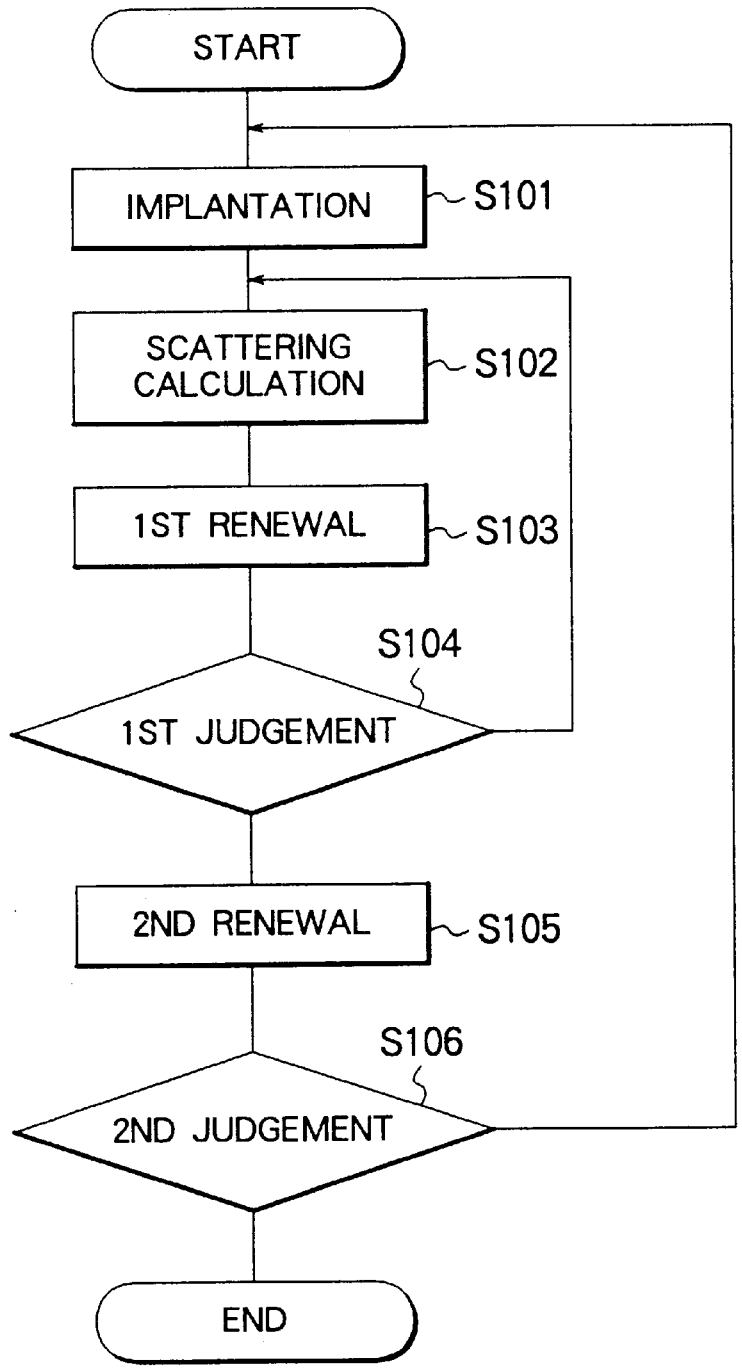
FIG. 1 is a flow chart for describing a first conventional simulation for ion implantation.
Figure 2:
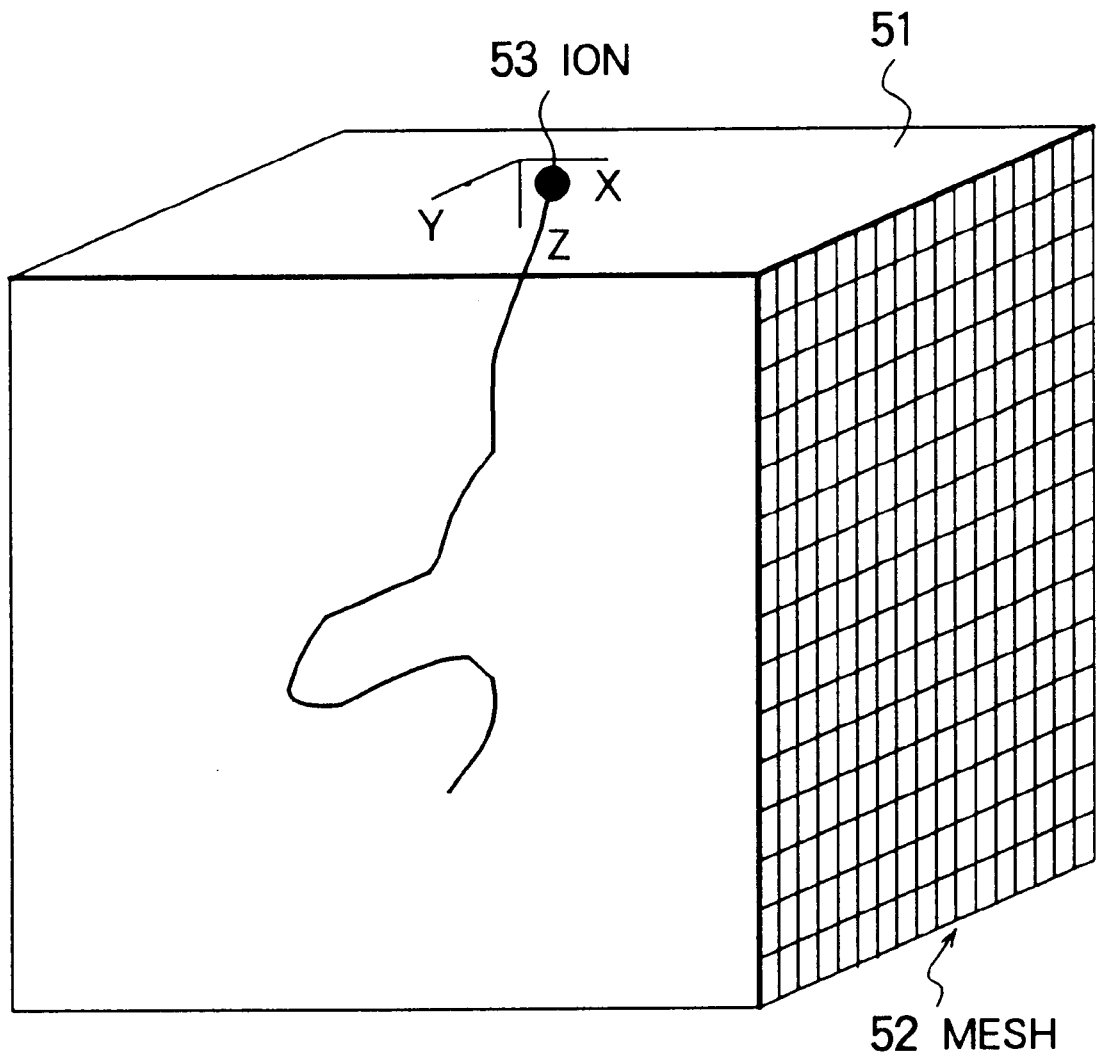
FIG. 2 shows a view for describing ion implantation in the simulation of FIG. 1.

Referring to FIG. 1, a first conventional simulation for ion implantation will be described at first in order to facilitate an understanding of this invention. The first conventional simulation is a simulation using Monte Carlo method. Ion implantation is simulated by a computer system which carries out the first convention simulation. In the first convention simulation, an ion is implanted to an amorphous substrate at a first step S101 labelled "IMPLANTATION". More particularly, the amorphous substrate may be, for example, a substrate 51 of a rectangular solid as shown in FIG. 2. In FIG. 2, orthogonal coordinates are defined on the substrate 51. Furthermore, two dimensional orthogonal meshes 52 are formed on a plane parallel to a Y–Z plane defined by Y–Z coordinates. The ion 53 is implanted from an upper surface of the substrate 51 into the substrate 51.

Random numbers are generated in order to calculate scattering of ion at a second step S102 labelled "SCATTER CALCULATION". In the second step S102, an impact parameter is determined in accordance with the random numbers. The impact parameter will be referred by a reference numeral P in FIG. 3A. When the ion 53 exists far from a nucleus 54 of the substrate 51, the impact parameter P is given by a distance between the nucleus 54 and a straight line which is directed from the ion 53 to a travelling direction of the ion 53. When the impact parameter P is determined in a manner described above, a scattering angle and a lost energy of the ion 53 is uniquely determined as known in the art. Furthermore, an azimuth of the ion 53 is calculated in accordance with the random numbers in the second step S102. As shown in FIG. 3B, the azimuth of the ion 53 is determined at a range of "0" to "2".

Renewal is carried out in concern with an ion energy, an ion position, and an ion travelling direction at a third step S103 labelled "1st RENEWAL". At a fourth step S104 labelled "1st JUDGEMENT", judgement is carried out which detects whether or not the ion 53 stops. When the ion 53 does not stop, the fourth step S104 is returned back to the first step S101.

When the ion 53 stops, it will be assumed that specific ions already exist in a mesh at which the ion 53 stops. The number of the specific ions is renewed in accordance with the weight of the ion 53 at a fifth step S105 labelled "2nd Renewal".

At a sixth step S106 labelled "2nd JUDGEMENT", judgement is carried out which detects whether or not a simulation ends in concern to all of sample particles. When the simulation does not end in concern to all of sample particles, the sixth step S106 is returned to the first step S101. When simulation ends in concern to all of sample particles, operation proceeds to an end.

Figure 4:
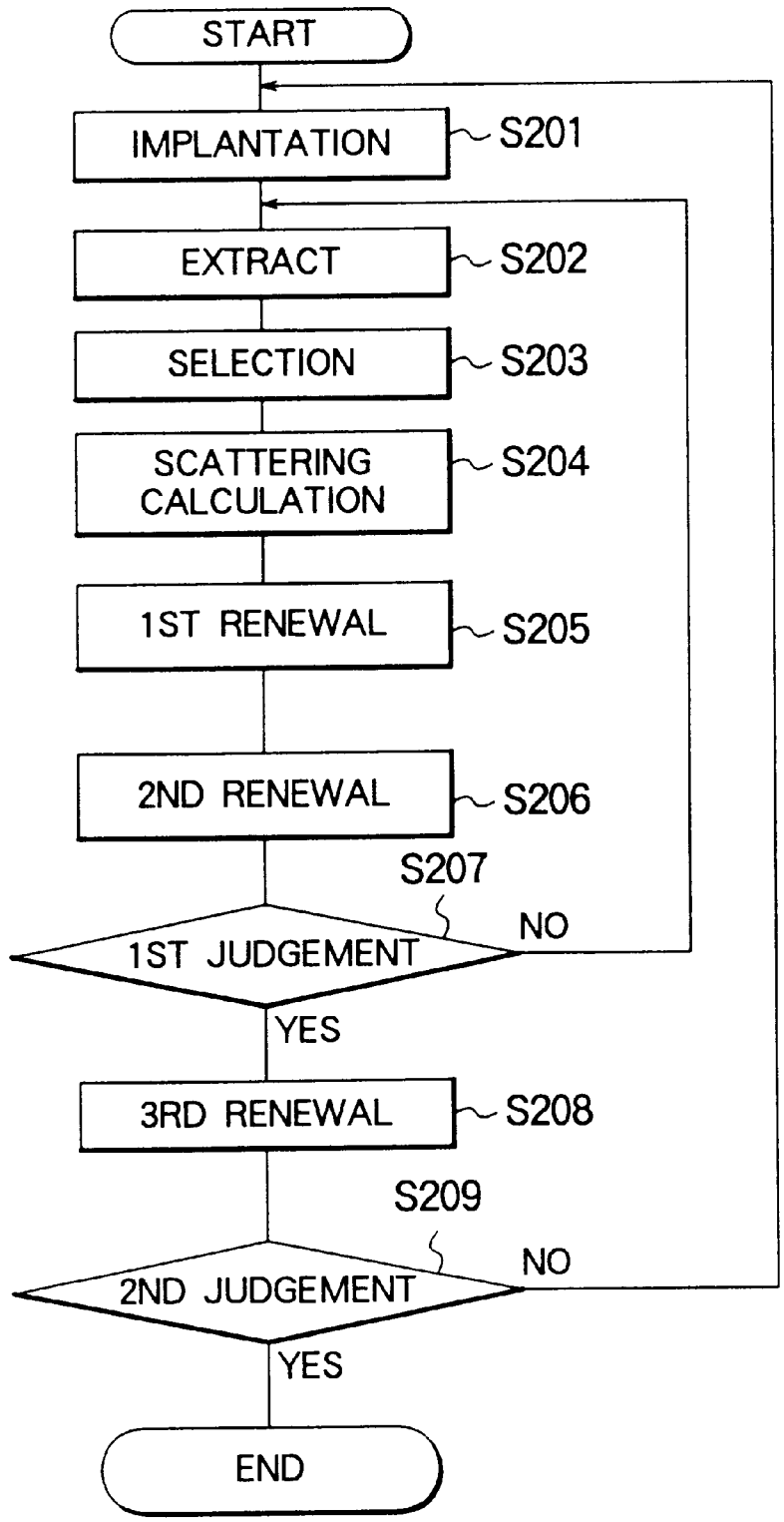
FIG. 4 is a flow chart for describing a second conventional simulation for ion implantation.

Referring to FIG. 4, description will be made as regards a second conventional simulation. The second conventional simulation is a simulation using Monte Carlo method. Ion implantation is simulated by a computer system which carries out the second convention simulation. In the second convention simulation, an ion is implanted in a crystal structure substrate at a first step S201 labelled "IMPLANTATION". More particularly, the crystal structure substrate may be, for example, the substrate 51 of a rectangular solid as shown in FIG. 2. The ion 53 is implanted from an upper surface of the substrate 51 into the substrate 51.

At a second step S202 labelled "EXTRACT", a point defect concentration is extracted from a mesh in which the ion 53 is positioned. The second step. S202 is followed by a third step S203 labelled "SELECTION". In the third step S203, either one of first and scattering calculation methods is selected as a selected scattering calculation method in an accordance with amorphous rate. On selecting the selected scattering calculation, probability given by (point defect concentration)/(atomic density of perfect crystal) is calculated as the amorphous rate. The first scattering calculation method is a method of obtaining scattering of ion at the amorphous substrate. The second scattering calculation method is a method of obtaining scattering of ion at the crystal structure substrate. Random numbers are generated in order to calculate scattering of ion at a fourth step S204 labelled "SCATTER CALCULATION".

Figure 3A:
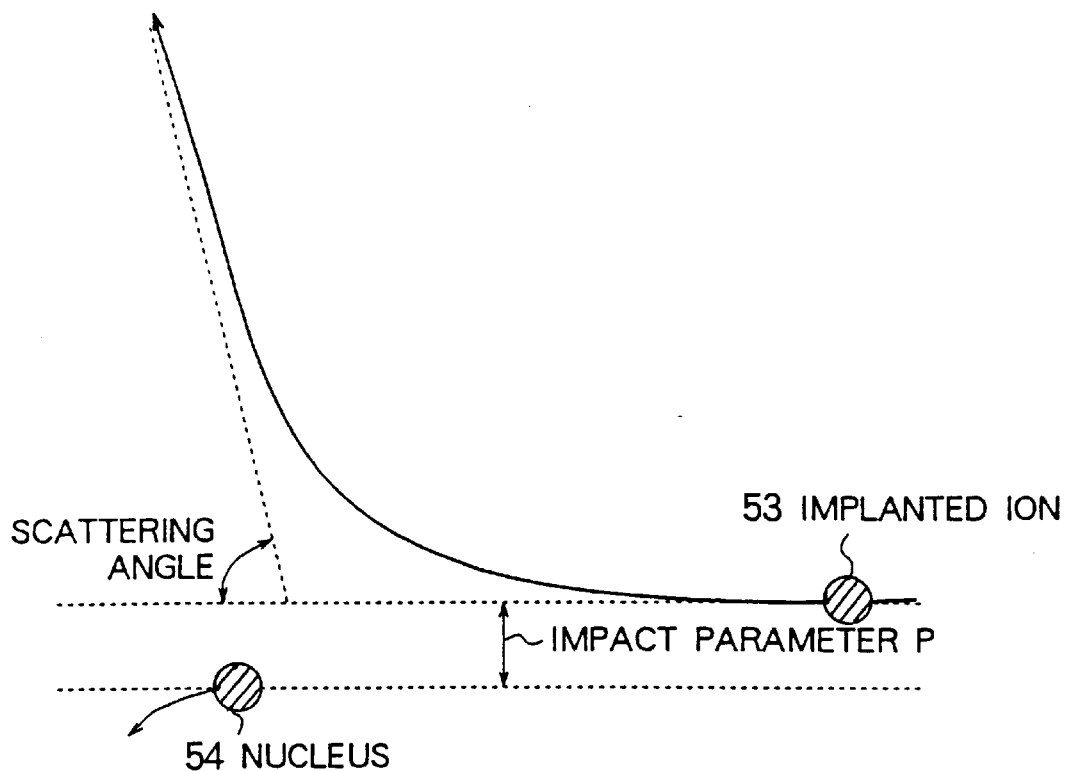
FIG. 3A shows a view for illustrating an impact parameter in the simulation of FIG. 1.
Figure 3B:
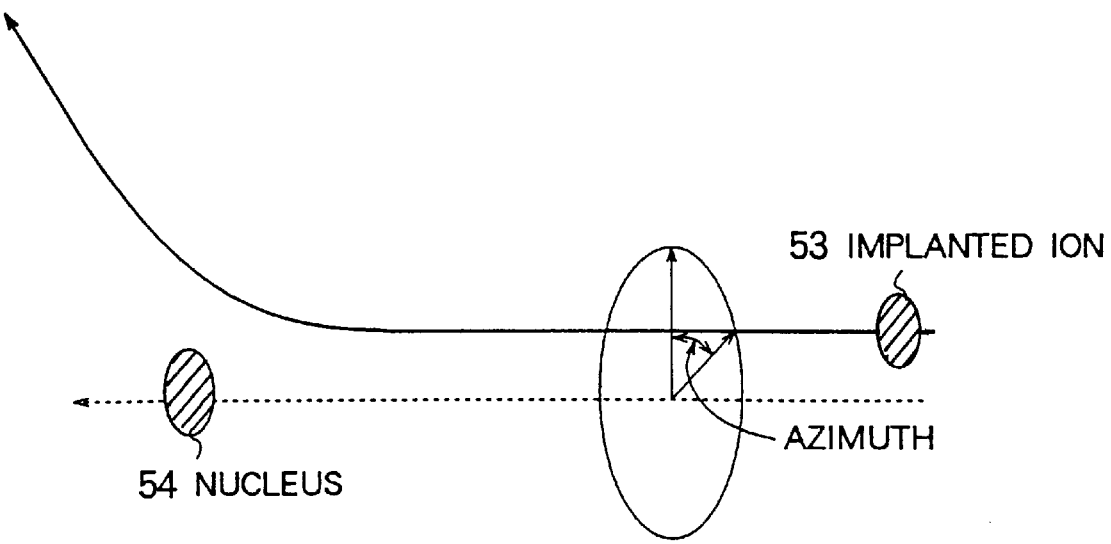
FIG. 3B shows a view for illustrating an azimuth in the simulation of FIG. 1.

When the first scattering calculation method is selected as the selected scattering method, the impact parameter and the azimuth are determined in accordance with random numbers as described in conjunction with FIGS. 3A and 3B. The scattering angle is calculated on the basis of the impact parameter. Furthermore, the energy lost by scattering is calculated on the basis of the impact parameter.

When the second scattering calculation method is selected as the selected scattering method, displacement of ion based on thermal oscillation of atoms in crystal structure is determined as a determined displacement in accordance with random numbers. The impact parameter and the azimuth are calculated at the determined displacement. The scattering angle is calculated on the basis of the impact parameter. Furthermore, the energy lost by scattering is calculated on the basis of the impact parameter.

The fourth step S204 is followed by a fifth step S205 labelled "1st RENEWAL". In the fifth step S205, the amount of the point defects is calculated which occur in accordance with the energy lost by scattering. Renewal is carried out in concern with the point defect concentration of the mesh in which the ion exists. Furthermore, renewal is carried in concern with the energy, the position, and travelling direction of ion at a sixth step S206 labelled "2nd RENEWAL".

The sixth step S206 is followed by a seventh step S207 labelled "1st JUDGEMENT". In the seventh step S207, judgement is carried out which detects whether or not the ion 53 stops. When the ion 53 does not stop, the seventh step S207 is returned back to the second step S202.

When the ion 53 stops, impurity concentration is renewed in the mesh at which the ion 53 stops, at an eighth step S208 labelled "3rd RENEWAL". At a ninth step S209 labelled "2nd JUDGEMENT", judgement is carried out which detects whether or not a simulation ends in concern to all of sample particles. When the simulation does not end in concern to all of sample particles, the ninth step S209 is returned to the first step S201. When simulation ends in concern to all of sample particles, operation proceeds to an end.

Figure 5:
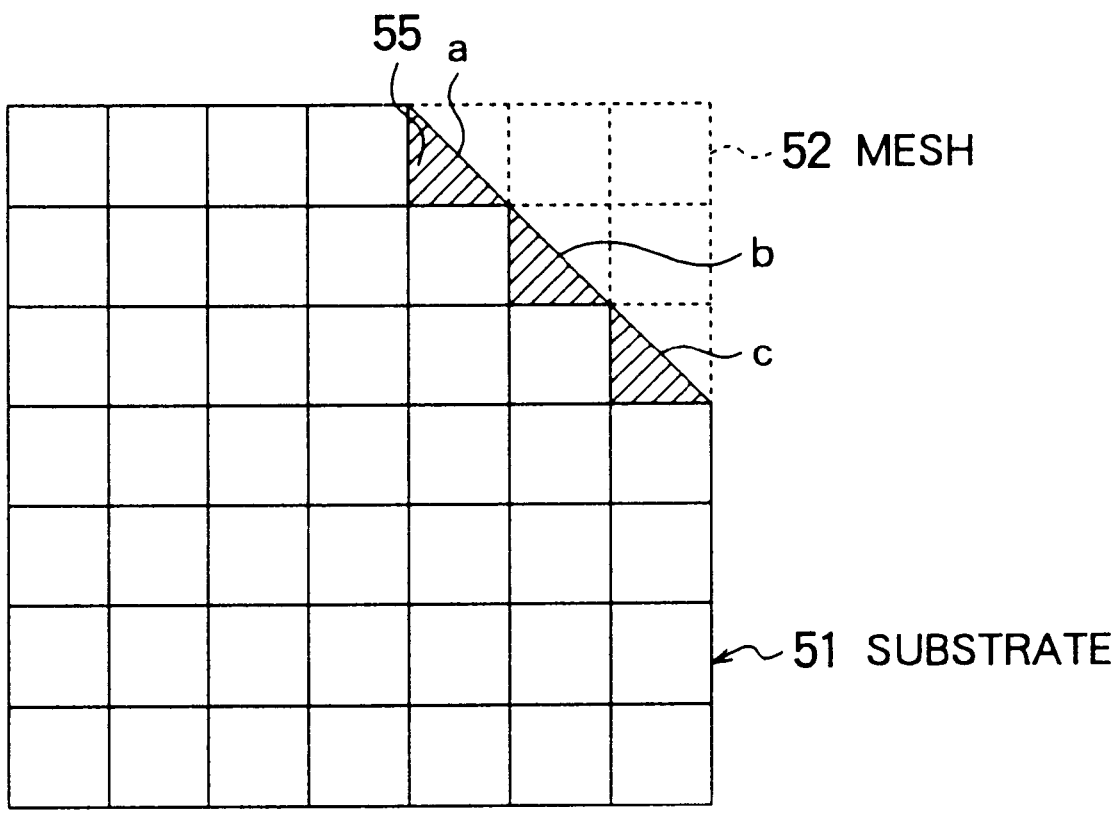
FIG. 5 shows a view for illustrating an orthogonal mesh on a polygonal substrate having a diagonal segment.

By the way, it will be assumed that the substrate 51 comprises a form having a diagonal segment 55 as shown in FIG. 5. When orthogonal meshes 52 are formed on the substrate illustrated in FIG. 5, regions a, b, and c, each of which is represented by oblique lines, exist on the substrate 51 as shown in FIG. 5. When the ion (not shown) stops any one of the regions a, b, and c, it is impossible to add the ion to the impurity concentration in each of the regions a, b, and c. As a result, it is difficult to accurately simulating ion implantation at a high speed.

Figure 6:
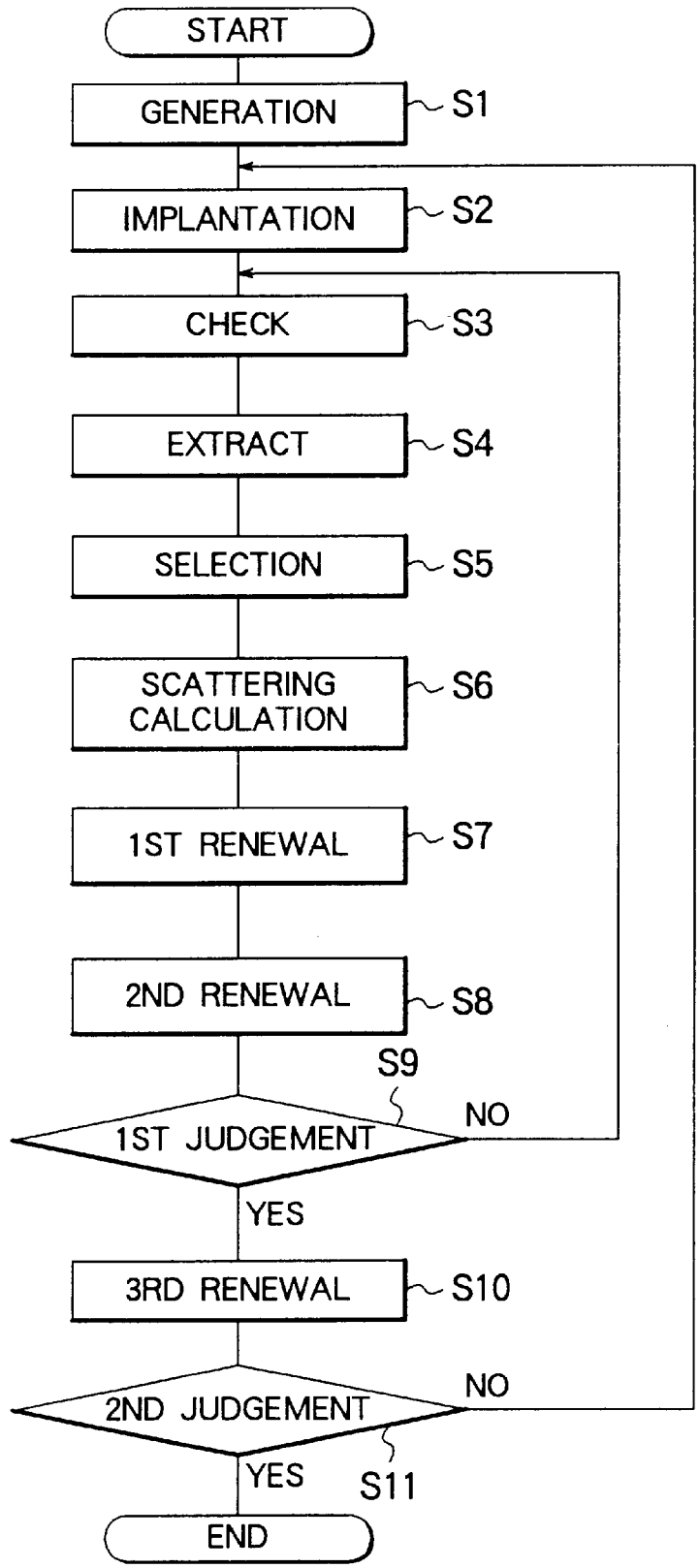
FIG. 6 is a flow chart for describing a simulation for ion implantation according to a first embodiment of this invention.

Referring to FIG. 6, description will proceed to a simulation of ion implantation according to a first embodiment of this invention. The simulation is for use in simulating ion implantation. More particularly, Monte Carlo method is used in the simulation of this invention. In the simulation for ion implantation, a plurality of meshes are generated on the substrate. Ion is implanted into the substrate. An impurity distribution and a point defect distribution based on the ion are defined in each of the meshes.

Figure 7:
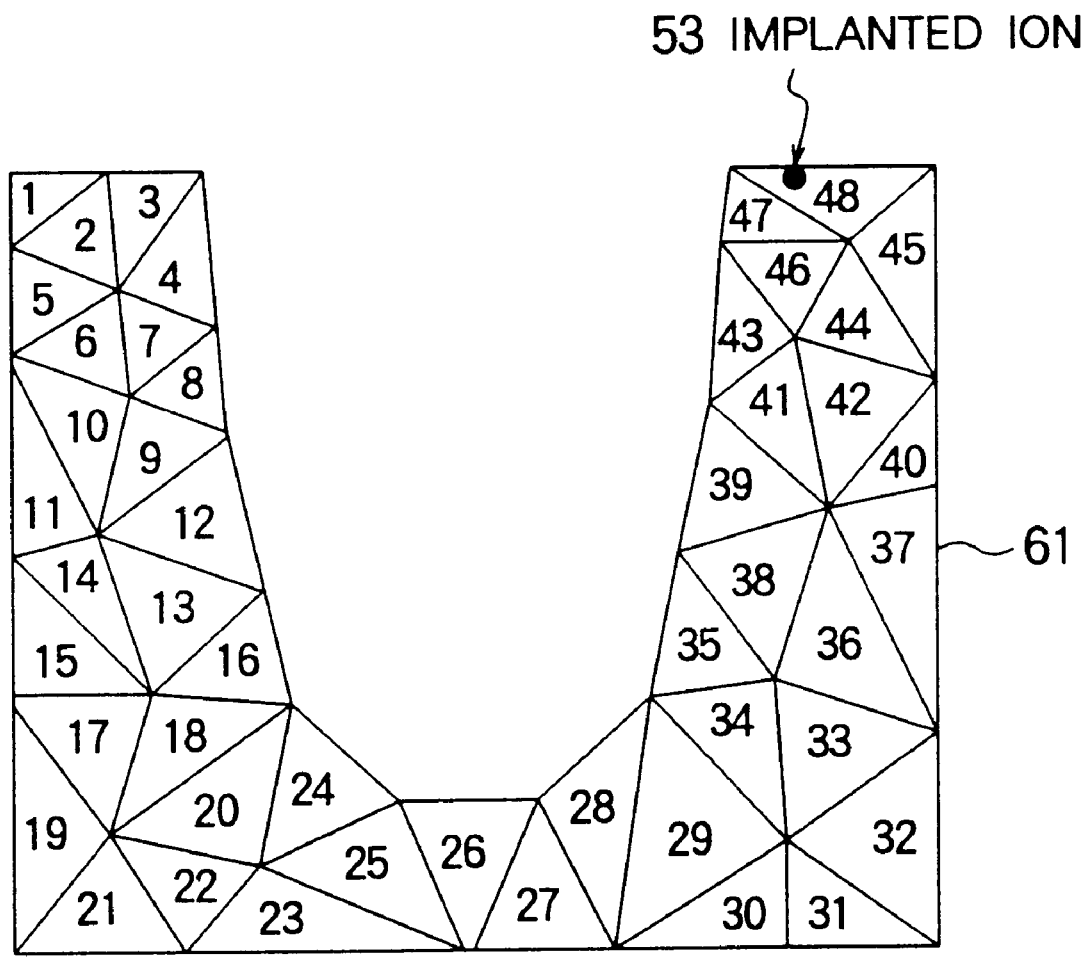
FIG. 7 shows a view for illustrating a triangle mesh on a polygonal substrate in the simulation of FIG. 6.

The simulation for ion implantation is carried out by a computer system (not shown). A plurality of meshes are generated on a substrate at a first step S1 labelled "GENERATION". As shown in FIG. 7, the substrate may be, for example, a polygonal substrate 61. Each of meshes has a triangle shape. Each of triangle meshes may be called a triangle element. In the first step S1, the triangle elements are labelled serial numbers. In the example being illustrated, the triangle elements are labelled "1" to "48" as the serial numbers.

An ion 53 is implanted from an upper surface of the polygonal substrate 61 to the polygonal substrate 61 at a second step S2 labelled "IMPLANTATION".

At a third step S3 labelled "CHECK", the triangle elements "1" to "48" are checked in an ascending order until a specific one of the triangle elements is found. The specific triangle element is a triangle element in which the implanted ion exists.

At a fourth step S4 labelled "EXTRACT", a point defect distribution is extracted from the specific triangle element. The fourth step S4 is followed by a fifth step S5 labelled "SELECTION". In the fifth step S5, either one of the first and the second scattering calculation methods is selected as the selected scattering calculation method in accordance with the amorphous rate as described in conjunction with FIG. 4.

Random numbers are generated in order to calculate scattering of ion at a sixth step S6 labelled "SCATTER CALCULATION". As described in conjunction with FIG. 4, the impact parameter and the azimuth are determined in accordance with random numbers in the sixth step S6. The scattering angle is calculated on the basis of the impact parameter. Furthermore, the energy lost by scattering is calculated on the basis of the impact parameter.

The sixth step S6 is followed by a seventh step S7 labelled "1st RENEWAL". In the seventh step S7, the amount of the point defects is calculated which occur in accordance with the energy lost by scattering. Renewal is carried out in concern with the point defect concentration of the mesh in which the ion exists. Furthermore, renewal is carried in concern with the energy, the position, and travelling direction of ion at an eighth step S8 labelled "2nd RENEWAL".

The eighth step S8 is followed by a ninth step S9 labelled "1JUDGEMENT". In the ninth step S9, judgement is carried out which detects whether or not the ion 53 stops. When the ion 53 does not stop, the ninth step S9 is returned back to the third step S3.

When the ion 53 stops, impurity concentration is renewed in the mesh at which the ion 53 stops, at a tenth step S10 labelled "2nd RENEWAL". At an eleventh step S11 labelled "2nd JUDGEMENT", judgement is carried out which detects whether or not a simulation ends in concern to all of sample particles. When the simulation does not end in concern to all of sample particles, the eleventh S11 is returned to the second step S2. When the simulation ends in concern to all of sample particles, operation proceeds to an end.

As described above, a plurality of triangle elements are formed on the polygonal substrate in the first embodiment. When the triangle elements are formed on the polygonal substrate, it is possible to cover the surface of the polygonal substrate by triangle elements. Therefore, it is possible to accurately simulating ion implantation at a high speed.

Figure 8:
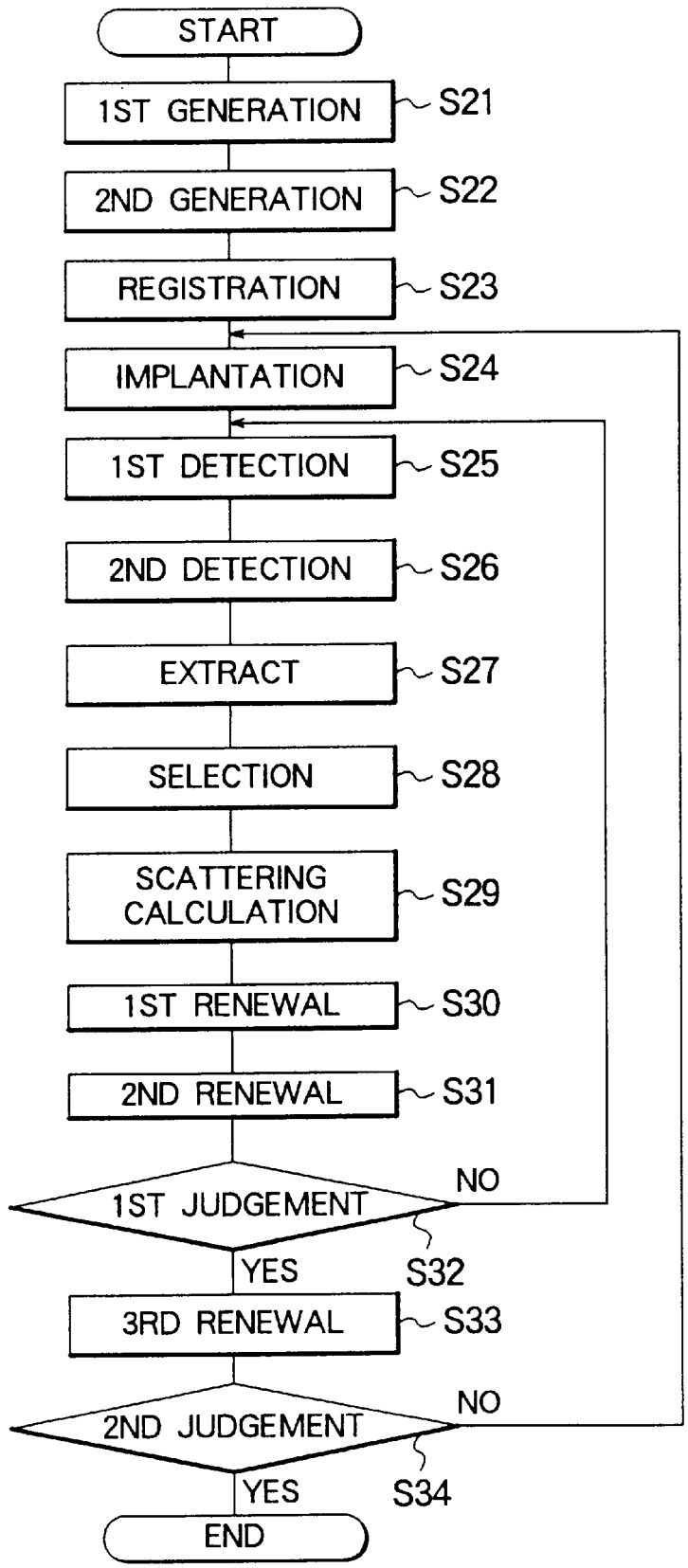
FIG. 8 is a flow chart for describing a simulation for ion implantation according to a second embodiment of this invention.
Figure 9:
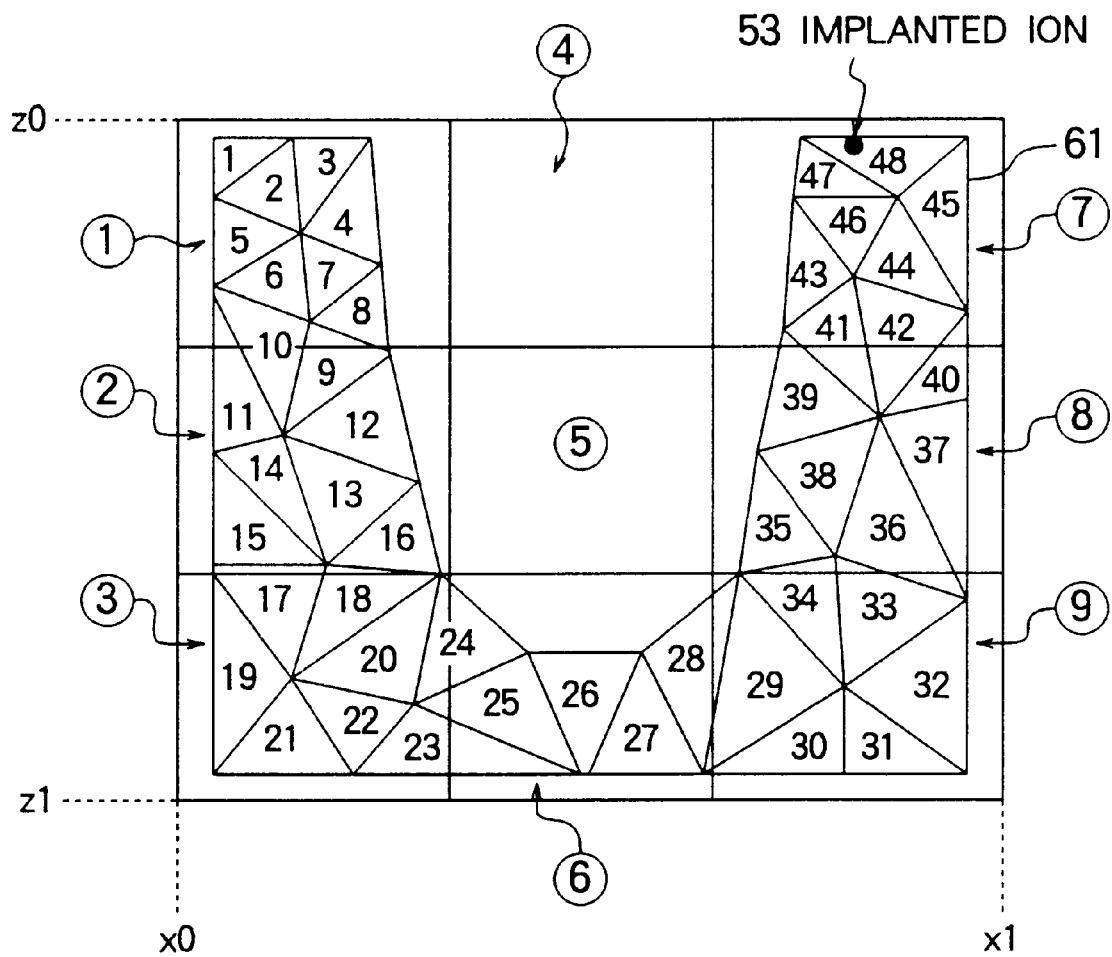
FIG. 9 shows a view for illustrating triangle and orthogonal meshes on a polygonal substrate in the simulation of FIG. 8.

Referring to FIG. 8, description will proceed to a simulation of ion implantation according to a second embodiment of this invention. A plurality of meshes are generated on a substrate at a first step S21 labelled "1st GENERATION". As shown in FIG. 9, the substrate may be, for example,a polygonal substrate 71. Each of meshes has a triangle shape. Each of triangle meshes may be called a triangle element. In the first step S21, the triangle elements are labelled serial numbers. In the example being illustrated, the triangle elements are labelled "1" to "48" as the serial numbers.

At a second step S22 labelled "2nd GENERATION", a plurality of orthogonal meshes generated as shown in FIG. 9. Each of orthogonal meshes may be called an orthogonal elements. The orthogonal elements are equal in shape to one another. The orthogonal elements are labelled serial circled numbers. In the example being illustrated, the orthogonal elements are labelled ① to ⑨ as the serial circled numbers.

At a third step S23 labelled "1st REGISTRATION", a particular one of the triangle elements is registered in a memory device(not shown) in correspondence to a specific one of the orthogonal elements that includes the particular triangle element. In the example being illustrated in FIG. 9, the triangle elements labelled "1" to "11" are registered in the memory device in correspondence to the orthogonal element labelled ①. The triangle elements labelled "8" to "18" are registered in the memory device in correspondence to the orthogonal element labelled ②. The triangle elements labelled "17" to "25" are registered in the memory device in correspondence to the orthogonal element labelled ③. Inasmuch as the orthogonal element labelled ④ or ⑤ has no triangle element, no triangle element is registered in the memory device in correspondence to the orthogonal element labelled ④ or ⑤. The triangle elements labelled "23" to "29" are registered in the memory device in correspondence to the orthogonal element labelled ⑥. The triangle elements labelled "28" to "34" and "36" and "37" are registered in the memory device in correspondence to the orthogonal element labelled ⑨. The triangle elements labelled "33" to "42" are registered in the memory device in correspondence to the orthogonal element labelled ⑧. The triangle elements labelled "39" to "48" are registered in the memory device in correspondence to the orthogonal element labelled ⑦.

An ion 53 is implanted from an upper surface of the polygonal substrate 61 into the polygonal substrate 61 at a fourth step S24 labelled "IMPLANTATION".

At a fifth step S25 labelled "1st DETECTION", one of the orthogonal elements is detected as a detected orthogonal element at which the implanted ion is positioned. More particularly, x–z coordinates are defined as shown in FIG. 9. It will be assumed that the origin is given by (x0, z0) and that the implanted ion 53 is positioned at the ordinates of (x, z). Calculation is carried out in concern with ix given by Equation (1). Furthermore, calculation is carried out in concern with iz given by Equation (2), where ix represents a position of the orthogonal element from the leftside of FIG. 9. The iz represents a position of the orthogonal element from upperside of FIG. 9. Therefore, the orthogonal element number is given by Equation (3)

$$ix = \text{int}\{(x-x0)/(\text{distance of meshes in a transverse direction})\}+1 \quad (1)$$

$$iz = \text{int}\{(z-z0)/(\text{distance of meshes in a longitudinal direction})\}+1 \quad (2)$$

where int represents omission of fractions.

$$\text{The orthogonal element number} = ix \times (\text{the division number of longitudinal direction}) + iz. \quad (3)$$

At a sixth step S26 labelled "2nd DETECTION", the registered triangle elements are searched which is included in the detected orthogonal element in order to detect one of the registered triangle elements as a detected triangle element at which the implanted ion is positioned.

At a seventh step S27 labelled "EXTRACT", a point defect distribution is extracted from the detected triangle element. The seventh step S27 is followed by a eighth step S28 labelled "SELECTION". In the eighth step S28, either one of the first and the second scattering calculation methods is selected as the selected scattering calculation method in accordance with the amorphous rate as described in conjunction with FIG. 4.

Random numbers are generated in order to calculate scattering of ion at a ninth step S29 labelled "SCATTERING CALCULATION". As described in conjunction with FIG. 4, the impact parameter and the azimuth are determined in accordance with random numbers in the ninth step S29. The scattering angle is calculated on the basis of the impact parameter. Furthermore, the energy lost by scattering is calculated on the basis of the impact parameter.

The ninth step S29 is followed by a tenth step S30 labelled "1st RENEWAL". In the tenth step S30, the amount of the point defects is calculated which occur in accordance with the energy lost by scattering. Renewal is carried out in concern with the point defect concentration of the detected triangle element. Furthermore, renewal is carried in concern with the energy, the position, and travelling direction of ion at an eleventh step S31 labelled "2nd RENEWAL".

The eleventh step S31 is followed by a twelfth step S32 labelled "1st JUDGEMENT". In the ninth step S9, judgement is carried out which detects whether or not the ion 53 stops. When the ion 53 does not stop, the twelfth step S32 is returned back to the fifth step S35.

When the ion 53 stops, impurity concentration is renewed in the mesh at which the ion 53 stops, at a thirteenth step S33 labelled "3rd RENEWAL". At a fourteenth step S44 labelled "2nd JUDGEMENT", judgement is carried out which detects whether or not a simulation ends in concern to all of sample particles. When the simulation does not end in concern to all of sample particles, the fourteenth S44 is returned to the fourth step S24. When the simulation ends in concern to all of sample particles, operation proceeds to an end.

As described above, a plurality of triangle elements are formed on the polygonal substrate in the second embodiment. When the triangle elements are formed on the polygonal substrate, it is possible to cover the surface of the polygonal substrate by triangle elements. Therefore, it is possible to accurately simulating ion implantation at a high speed.

Furthermore, it is possible simulating ion implantation at a more high speed inasmuch as the registered triangle elements are searched in correspondence to the detected orthogonal element in order to detect the detected triangle element.

While this invention has thus far been described in conjunction with the preferred embodiments thereof, it will readily be possible for those skilled in the art to put this invention into practice in various other manners.

What is claimed is:

1. A method for simulating ion implantation on the basis of Monte Carlo method, comprising the steps of:

producing a plurality of triangle meshes to a substrate;

implanting an ion as an implanted ion to said substrate; and calculating distributions of impurities and point defects which are based on said implanted ion, at each of said triangle meshes.

2. A method claimed in claim 1, wherein said method further comprises the steps of:

producing a plurality of orthogonal meshes to register said triangle meshes as registered triangle meshes in correspondence to said orthogonal meshes;

detecting one of said orthogonal meshes in that said implanted ion positioned, as a detected orthogonal mesh; and carrying out said calculating step in each of said triangle meshes which are registered in correspondence to said detected orthogonal mesh.

3. A method for simulating ion implantation on the basis of Monte Carlo method, comprising:

a first step of producing a plurality of triangle meshes to a polygonal substrate to label said triangle meshes serial numbers;

a second step of implanting an ion as an implanted ion to said polygonal substrate;

a third step of checking said triangle meshes in an ascending order until one of triangle meshes is found as a specific triangle mesh in which said implanted ion is positioned;

a fourth step of extracting point defect concentration from said specific triangle mesh;

a fifth step of generating random numbers to calculate scattering of said implanted ion;

a sixth step of renewing the point defect concentration in said specific triangle mesh;

a seventh step of renewing the energy, the position, and the travelling direction of said implanted ion; and an eighth step of repeating said third to said seventh steps until said implanted ion stops in said polygonal substrate.

4. A method claimed in claim 3, wherein said method further comprises a ninth step of repeating said second to said eighth steps in concern with all of sample particles.

5. A method for simulating ion implantation on the basis of Monte Carlo method, comprising:

a first step of producing a plurality of triangle meshes to a polygonal substrate;

a second step of producing a plurality of orthogonal meshes to said polygonal substrate, said orthogonal meshes being equal in shape to one another;

a third step of registering said triangle meshes as registered triangle meshes in correspondence to said orthogonal meshes;

a fourth step of implanting an ion as an implanted ion to said polygonal substrate;

a fifth step of detecting one of said orthogonal meshes as a detected orthogonal mesh in which said implanted ion is positioned;

a sixth step of searching the registered triangle meshes in correspondence to said detected orthogonal mesh to detect one of the registered triangle meshes as a detected triangle mesh in which said implanted ion is positioned;

a seventh step of extracting point defect concentration from said detected triangle mesh;

an eighth step of generating random numbers to calculate scattering of said implanted ion;

a ninth step of renewing the point defect concentration in said detected triangle mesh;

a tenth step of renewing the energy, the position, and the travelling direction of said implanted ion; and an eleventh step of repeating said fifth to said tenth steps until said implanted ion stops in said polygonal substrate.

6. A method claimed in claim 5, wherein said method further comprises a twelfth step of repeating said fourth to said eleventh steps in concern with all of sample particles.

* * * * *